United States Patent Office 3,092,622
Patented June 4, 1963

3,092,622
**6-CHLORO-4,6-ANDROSTADIENO-
[3,2-c]PYRAZOLES**
Ralph F. Hirschmann, Scotch Plains, N.J., assignor to Merck & Co., Inc., Rahway, N.J., a corporation of New Jersey
No Drawing. Filed Dec. 1, 1961, Ser. No. 156,467
17 Claims. (Cl. 260—239.5)

This invention is concerned with novel steroid compounds and to processes of preparing the same. More particularly, it relates to novel 6-chloro-4,6-androstadieno-[3,2-c]pyrazoles having structures A and B:

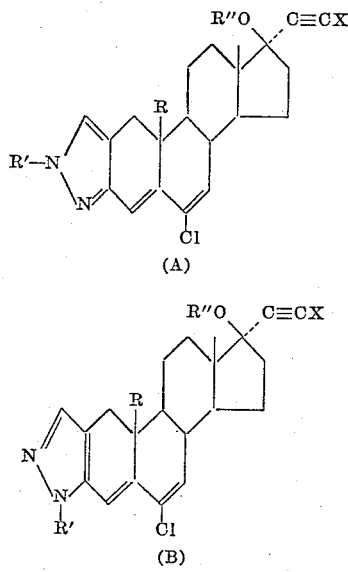

wherein X stands for hydrogen, halogen or the trifluoromethyl group, R is methyl or hydrogen, R' is hydrogen, acyl, alkyl, cycloalkyl, aryl or aralkyl, and R" is hydrogen, alkyl or acyl.

This is a continuation-in-part of copending application Serial No. 88,659, filed February 13, 1961.

The compounds prepared by my invention possess useful therapeutic properties as orally and parenterally active progestational and estrogenic agents, and also as agents which reduce the level of blood cholesterol.

In preparing my novel chemical compounds, the starting material utilized is a 6-chloro-17β-hydroxy-4,6-androstadiene-3-one having the formula:

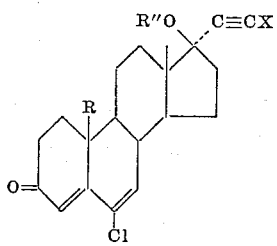

wherein X, R and R" having the meaning above defined.

The starting materials which are employed in the process of my invention include: 6-chloro-17α-ethynyl-17β-hydroxy - 4,6 - androstadiene-3-one, 6-chloro-17α-ethynyl-17β-methoxy-4,6-androstadiene-3-one, 6 - chloro-17α-chloroethynyl-17β-methoxy - 4,6 - androstadiene-3-one, 6-chloro-17α-chloroethynyl-17β-hydroxy-4,6-androstadiene-3-one, 17α-bromoethynyl-6-chloro-17β-hydroxy-4,6-androstadiene-3-one, 17α-bromoethynyl-6-chloro-17β-methoxy-4,6-androstadiene - 3 - one, 6-chloro-17α-fluoroethynyl-17β-methoxy-4,6-androstadiene - 3 - one, 6-chloro-17α - fluoroethynyl-17β-hydroxy-4,6-androstadiene-3-one, 6-chloro-17α-trifluoropropynyl - 17β - hydroxy-4,6-androstadiene-3-one, 6-chloro - 17α - trifluoropropynyl - 17β-methoxy-4,6-androstadiene-3-one and the corresponding 19-nor compounds.

The 17β-alkoxy-4,6-androstadiene-3-one can be prepared by reaction of the 17β-hydroxy compound with an alkyl halide and silver oxide in a solvent such as dimethylformamide. The alkyl halides which may be used for this purpose include methyl iodide, ethyl iodide, n-propyl iodide, n-butyl iodide and the like.

The above 4,6-androstadiene-3-one starting materials react with an alkyl formate and sodium hydride in an inert atmosphere to form the corresponding 2-hydroxymethylene-derivatives which have the following structure:

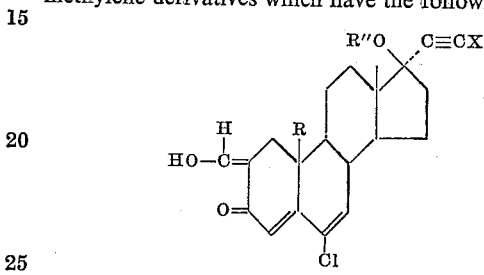

wherein X, R and R" have the meaning above defined.

Upon treatment of the 2 - hydroxymethylene - 4,6-androstadiene-3-one compound with a lower alkanol in the presence of an acidic reagent such as p-toluenesulfonic acid the corresponding 2-alkoxymethylene-4,6-androstadiene-3-one is formed. The latter compound reacts with hydrazine in an inert atmosphere to form the corresponding 4,6-androstadieno-[3,2-c]pyrazole.

When the 2-alkoxymethylene-4,6-androstadiene-3-one is reacted with a monosubstituted-hydrazine, the corresponding N-substituted-4,6-androstadieno-[3,2-c]pyrazole compounds are formed. The N-substituted-4,6-androstadieno-[3,2-c]pyrazoles having structure "A" are designated as the 1'-substituted-4,6-androstadieno-[3,2-c]pyrazoles, and the N-substituted-pyrazole compounds having structure "B" are designated as the 2'-substituted-4,6-androstadieno-[3,2-c]pyrazoles.

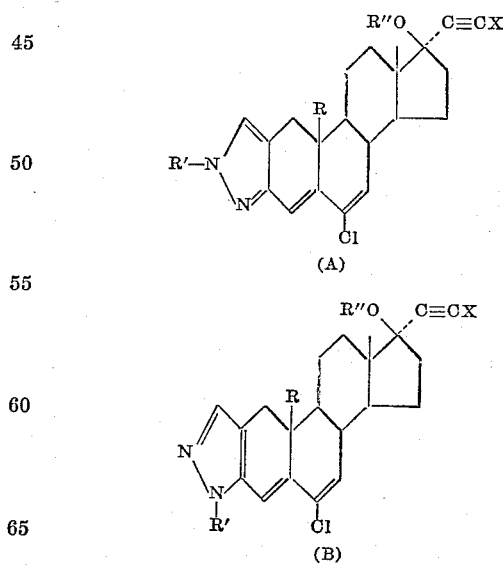

wherein X, R, R' and R" have the meaning above defined.

Upon treatment of a 2-hydroxymethylene-4,6-androstadiene-3-one compound directly with a monosubstituted arylhydrazine, without the intermediate formation of the 2-alkoxymethylene-derivative, on isomer is generally formed in preponderant amounts, whereas when reacting the 2-alkoxymethylene-4,6-androstadiene-3-one compound with a monosubstituted arylhydrazine, significant amounts of both isomers are obtained. When these reactions take place with monosubstituted-alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

Among the mono substituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazino-pyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted-4,6-androstadieno-[3,2-c]pyrazoles including: N-alkyl such as N-methyl-, N-ethyl-, N-butyl-, N-propyl-, N-(β-hydroxyethyl)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1″-naphthyl)-, N-(2″-pyridyl)-, N-(3″-pyridyl)-, N-(4″-pyridyl)-, N-(4″-pyridyloxide)-, N-(2″-pyrimidyl)-; N-aralkyl-, such as N-benzyl- and N-phenylethenyl-4,6-androstadieno-[3,2-c]pyrazoles.

The N-alkyl-4,6-androstadieno-[3,2-c]pyrazoles may also be prepared by direct alkylation of the N-unsubstituted-4,6-androstadieno-[3,2-c]pyrazoles.

The compounds of our invention include, among others, the following: 6-chloro-17α-ethynyl-17β-hydroxy-4,6-androstadieno-[3,2-c]pyrazole, 6-chloro-17α-chloroethynyl-17β-hydroxy-4,6-androstadieno-[3,2-c]pyrazole, 6-chloro-17α-bromoethynyl-17β-hydroxy-4,6-androstadieno-[3,2-c]pyrazole, 6-chloro-17α-fluoroethynyl-17β-hydroxy-4,6-androstadieno-[3,2-c]pyrazole, 6-chloro-17α-trifluoropropynyl-17β-hydroxy-4,6-androstadieno-[3,2-c]pyrazole, 6-chloro-17α-ethynyl-17β-hydroxy-19-nor-4,6-androstadieno-[3,2-c]pyrazole, 6-chloro-17α-chloroethynyl-17β-hydroxy-19-nor-4,6-androstadieno-[3,2-c]pyrazole, 6-chloro-17α-bromoethynyl-17β-hydroxy-19-nor-4,6-androstadieno-[3,2-c]pyrazole, 6-chloro-17α-fluoroethynyl-17β-hydroxy-19-nor-4,6-androstadieno-[3,2-c]pyrazole, 6-chloro-17α-trifluoropropynyl-17β-hydroxy-19-nor-4,6-androstadieno-[3,2-c]pyrazole.

This invention also includes the 17β-alkoxy-ethers and 17β-alkanoyl-esters of the foregoing compounds, as well as the 1'- and 2'-alkyl-, the 1'- and 2'-cycloalkyl-, the 1'- and 2'-aryl-, and the 1'- and 2'-aralkyl-derivatives of all of the 17β-hydroxy-, 17β-alkoxy-ethers and 17β-alkanoyl-esters of the above named compounds.

The 6-chloro-17β-hydroxy-4,6-androstadieno-[3,2-c] pyrazole compounds are converted into 17β-alkanoyl-esters by reaction with an alkanoic acid anhydride or alkanoyl halide in the presence of a tertiary amine such as pyridine. The acid anhydrides which may be used for this purpose include acetic anhydride, propionic anhydride, butyric anhydride and the like. The 17β-caproate is prepared by the reaction of the 17β-free alcohol with caproyl halide in the presence of a tertiary amine base. When R' is hydrogen, two equivalents of the acylating agent are used and the hydrogen at R' is also replaced by an acyl group during this reaction.

The following examples illustrate methods of carrying out the present invention but it is to be understood that these examples are given for purposes of illustration and not of limitation.

The following examples illustrate methods of carrying out the present invention but it is to be understood that these examples are given for purposes of illustration and not of limitation.

*Example 1*

A suspension of 610 mg. of 6-chloro-17α-ethynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-ethynyl-17β-hydroxy-2-hydroxymethylene-19-nor-4,6-androstadiene-3-one, which is taken up in methylene chloride. The solution is filtered and evaporated to dryness.

A 25 mg. aliquot of 6-chloro-17α-ethynyl-17β-hydroxy-2-hydroxymethylene-19-nor-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-ethynyl-17β-hydroxy-19-nor-4,6-androstadieno-[3,2-c]pyrazole.

*Example 2*

A suspension of 610 mg. of 6-chloro-17α-ethynyl-17β-hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is then filtered and evaporated to dryness to afford 6-chloro-17α-ethynyl-17β-hydroxy-2-hydroxymethylene-4,6-androstadiene-3-one.

A 25 mg. aliquot of 6-chloro-17α-ethynyl-17β-hydroxy-2-hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6- chloro-17α-ethynyl-17β-hydroxy-4,6-antrostadieno-[3,2-c]pyrazole.

Example 3

A suspension of 610 mg. of 6-chloro-17α-chloroethynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is then filtered and evaporated to dryness to afford 6-chloro-17α-chloroethynyl-17β-hydroxy-2-hydroxymethylene-19-nor-4,6-antrostadiene-3-one.

A 25 mg. aliquot of 6-chloro-17α-chloroethynyl-17β-hydroxy-2-hydroxymethylene - 19 - nor - 4,6 - androstadiene-3-one is dissolved in 0.6 ml. of ethanol. An 0.032 ml. aliquot of a reagent, prepared by dissolving 0.48 ml. of hydrazine hydrate in 096 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-chloroethynyl-17β-hydroxy-19-nor-4,6-androstadieno-[3,2-c]-pyrazole.

In accordance with the above procedures, but starting with the 17α-bromoethynyl- or the 17α-fluoro-ethynyl-6-chloro - 17β - hydroxy-19-nor-4,6-androstadiene-3-one in place of the 17α-chloroethynyl-6-chloro-17β-hydroxy-19-nor-4,6-androstadiene-3-one there is obtained the corresponding 17α-bromoethynyl- or the 17α-fluoroethynyl-6-chloro - 17β - hydroxy - 19 - nor - 4,6 - androstadieno [3,2-c]pyrazole.

The starting materials can be prepared by the following procedures: A solution consisting of 1.7 g. (1.32 cc.) of cis-1,2-dichloroethylene in 10 cc. of sodium dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium dried ether. The reaction mixture is stirred at room temperature under nitrogen for an additional 1½ hours, followed by the addition over a 15-minute period of 100 mg. of 3-methoxy-2,5(10)-androstadiene-17-one in 4 cc. of sodium dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α - chloroethynyl-3-methoxy-2,5(10)-androstadiene-17β-ol, M.P. 80–85° C.

I.R. $\lambda_{max.}^{Nujol}$ 2.80, 4.48, 6.02, 6.12μ

In accordance with the above procedure, but using 1,2-dibromoethylene in place of 1,2-dichloroethylene, there is obtained the 17α-bromoethynyl-3-methoxy-2,5(10)-androstadiene-17β-ol.

In accordance with the above procedure, but using 1-chloro-2-fluoroethylene in place of 1,2-dichloroethylene, there is obtained a mixture of the 17α-chloroethynyl- and the 17α - fluoroethynyl-3-methoxy-2,5(10)-androstadiene-17β-ol, which compounds are separated by chromatography.

A solution consisting of 10 mg. of 17α-chloroethynyl-3-methoxy-2,5(10)-androstadiene-17β-ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α-chloroethynyl - 17β - hydroxy-19-nor-4-androstene-3-one, M.P. 185–190° C.

I.R. $\lambda_{max.}^{Nujol}$ 2.95, 4.50, 6.10, 6.21μ

To a solution of 100 mg. of 17α-chloroethynyl-17β-hydroxy-19-nor-4-androstene-3-one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α-chloroethynyl - 19 - nor - 3,5 - androstadiene-17β-ol, I.R. $\lambda_{max.}^{Neat}$ 2.86, 4.50, 6.05, 6.15μ

A solution consisting of 1 g. of 3-ethoxy-17α-chloroethynyl-19-nor-3,5-androstadiene-17β-ol, 700 mg. of sodium acetate, 5 ml. of water and 40 ml. of acetone is cooled to 0° C. and 1.07 g. of N bromosuccinimide and 0.83 ml. of acetic acid is added. The mixture is stirred for three hours at 0.5° C. and then poured into water to yield the 6β-bromo-17α-chloroethynyl - 17β - hydroxy-19-nor-4-androstene-3-one.

Treatment of 6β-bromo - 17α - chloroethynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C., followed by dilution with ice water and filtration affords 17α-chloroethynyl - 17β - hydroxy - 19 - nor-4,6-androstadiene-3-one.

A solution consisting of 675 mg. of 17α-chloroethynyl-17β-hydroxy-19-nor-4,6-androstadiene-3-one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo. The crude 6,7-epoxy-17α-chloroethynyl-17β-hydroxy-19-nor-4-androstene-3-one is used directly in the next step.

The 6,7 - epoxy-17α-chloroethynyl-17β-hydroxy-19-nor-4-androstene-3-one, dissolved in 20 ml. of 0.4 N hydrochloric acid in chloroform, is allowed to stand for 5.5 hours at room temperature, and then subsequently poured into iced sodium bicarbonate solution. The mixture is extracted with chloroform, dried, and concentrated in vacuo. Chromatography on acid-washed alumina (20 g.) and elution with ether-petroleum ether mixtures affords the 6 - chloro - 17α - chloroethynyl - 17β-hydroxy-19-nor-4,6-androstadiene-3-one.

In accordance with the above procedures, but starting with the 17α-bromoethynyl- or the 17α-fluoroethynyl-3-methoxy-2,5(10)-androstadiene-17β-ol in place of the 17α - chloroethynyl - 3 - methoxy - 2,5(10)-androstadiene-17β-ol, there is obtained the corresponding 17α-bromoethynyl- or the 17α-fluoroethynyl-6-chloro-17β-hydroxy-19-nor-4,6-androstadiene-3-one.

Example 4

A suspension of 610 mg. of 6-chloro-17α-chloroethynyl-17β-hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-chloroethynyl-17β-hydroxy-2-hydroxymethylene-4,6-androstadiene-3-one, which is taken up in methylene chloride. The solution is filtered and evaporated to dryness.

A 25 mg. aliquot of 6-chloro-17α-chloroethynyl-17β-hydroxy - 2 - hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-chloroethynyl-17β-hydroxy-4,6-androstadieno-[3,2-c]pyrazole.

In accordance with the above procedures, but starting with the 17α-bromoethynyl- or the 17α-fluoroethynyl-6-chloro-17β-hydroxy-4,6-androstadiene-3-one in place of the 17α - chloroethynyl - 6-chloro-17β-hydroxy-4,6-androstadiene-3-one there is obtained the corresponding 17α-bromoethynyl- or the 17α-fluoroethynyl-6-chloro-17β-hydroxy-4,6-androstadieno-[3,2-c]pyrazole.

The starting materials can be prepared by the following procedures: Twenty mg. of p-toluenesulfonyl chloride is added to 400 mg. of 17α-ethynyl-5-androstene-3β,17β-diol in 20 ml. of dihydropyran. The resulting mixture is allowed to stand at room temperature overnight. A 2.5 N NaOH solution is added until the mixture is slightly alkaline. Water is then added and the aqueous phase extracted with 4 portions of ether, each containing approximately 50 ml. The combined ether layers are washed with water, dried over Na₂SO₄ and evaporated under reduced pressure to give about 725 mg. of a non-crystalline product. The product dissolved in petroleum ether is chromatographed on 60 g. of neutral alumina and the chromatogram eluted with a 7:3 mixture of petroleum ether and ether to give 400 mg. of crystalline product, the 17α - ethynyl - 5-androstene - 3β,17β - diol-bis-tetrahydropyranyl ether I.R. $\lambda_{max.}^{Nujol}$ 2.90μ

A solution of about 4 grams of 17α-ethynyl-5-androstene-3β,17β-diol-bis-tetrahydropyranyl ether in 75 ml. of t-butyl alcohol is prepared. About 1.1 equivalents of a 1.0 molar potassium t-butoxide is added and the resulting mixture is refluxed for one hour with stirring, and then cooled. About 1.84 ml. of t-butyl hypochlorite is then added in one portion and the reaction mixture is left stirring at room temperature overnight. About 100 ml. of water is added and the resulting aqueous mixture is extracted with four portions of ether, each containing approximately 200 ml. The combined layers are washed with water, dried over sodium sulfate, filtered and evaporated to dryness in vacuo. The residual material is dissolved in petroleum ether and chromatographed on 120 g. of alumina. Elution with petroleum ether gives about 3.10 grams (a 70% yield) of crystals of 17α-chloroethynyl-5-androstene-3β,17β-diol-bis-tetrahydropyranyl ether. The crude product shows infrared peaks at 4.4μ and 2.9μ.

A solution of about 3 g. of the 17α-chloroethynyl-5-androstene-3β,17β-diol-bis-tetrahydropyranyl ether in 125 ml. of methanol is prepared. To this solution is added 2.5 ml. of concentrated hydrochloric acid and the reaction mixture is stirred for about 1 hour at room temperature. The methanol is then removed by evaporation under reduced pressure until the product crystallizes. Approximately 100 ml. of water is then added and the resulting product is extracted with four portions of ether, each containing about 200 ml. The combined ether extract is washed with water, dried over sodium sulfate and evaporated to a crystalline residue. The residual crystalline material is recrystallized several times from ether to give about 1.58 g. of 17α-chloroethynyl-5-androstene-3β,17β-diol which has the following properties: M.P. 195° C. Analysis.—(Calculated for $C_{21}H_{29}O_2Cl$): C, 72.30; H, 8.38; Cl, 10.16. Found: C, 71.64; H, 8.63; Cl, 10.48.

One hundred mg. of 17α-chloroethynyl-5-androstene-3β,17β-diol is dissolved in 1.0 ml. of cyclohexanone and 10 ml. of benzene in a flask fitted with a magnetic stirrer and a reflux condenser. About 5 ml. of the benzene is distilled and a stream of dry nitrogen is passed through the system and maintained throughout the reaction time. Then 0.5 ml. of a 10% solution of aluminum isopropoxide in benzene is added and the reaction mixture is maintained at reflux temperature for 4 hours. The solution is cooled, 5 drops of water are added and the resultant aluminum hydroxide is filtered off. The filtrate is taken to dryness under reduced pressure. The material is dissolved in ether, filtered, and the filtrate concentrated to give about 37 mg. of crude 17α-chloroethynyl-4-androstene-17β-ol-3-one, M.P. 178–183° C. Recrystallization from ether gives about 25 mg. of the purified product, M.P. 182–184° C. Chromatography of all mother liquors on 3 g. of alumina and elution of the chromatogram with ether gives an additional 20 mg. of product, M.P. 181–184° C. Total yield 45 mg. The product has the following properties:

U.V. $\lambda_{max.}^{MeOH}$ 241 mμ, ε 15,000. I.R. $\lambda_{max.}^{Nujol}$ 2.8, 4.43, 6.0 6.18μ

Analysis.—(Calculated for $C_{21}H_{27}O_2Cl$): C, 72.73; H, 7.85; Cl, 10.22. Found: C, 73.41; H, 7.93; Cl, 10.81.

To a solution of 482 mg. of 17α-ethynyl-5-androstene-3β,17β-diol-bis-tetrahydropyranyl ether in 10 ml. of tertiary-butyl alcohol, is added about 1.1 equivalents of a 1.0 molar potassium t-butoxide. The resulting mixture is refluxed for one hour, with stirring, and then cooled. 196 mg. of N-bromosuccinimide is then added and the reaction mixture is stirred at room temperature for about 18 hours. The entire reaction mixture is dissolved in water and then extracted with 3 portions of ether, each containing approximately 50 ml. The combined ether extracts are washed with three portions of a saturated solution of NaHCO₃, each portion containing approximately 25 ml., then with 3 portions of water, each containing about 25 ml. The ether layer is dried over sodium sulfate, filtered and evaporated to dryness. The oily residue is filtered through 20 g. of aluminum oxide to give 407 mg. of oily material which is dissolved in petroleum ether and chromatographed on 30 g. of acetone activated alkaline alumina. Elution with a 9:1 mixture of petroleum ether and ether yields 87 mg. of 17α-bromoethynyl-5-androstene-3β,17β-diol-bis-tetrahydropyranyl ether. An infrared spectrum of this material shows $\lambda_{max.}$ 4.5μ.

To a solution of 400 mg. of 17α-bromoethynyl-5-androstene-3β,17β-diol-bis-tetrahydropyranyl ether in 40 ml. of methanol is added 0.8 ml. of concentrated HCl, and the reaction mixture is stirred for one hour at room temperature. The methanol is then removed under reduced pressure. Water is added and the resulting solution is extracted with 3 portions of ether, each portion containing approximately 75 ml. The combined ether extracts are washed three times with approximately 50 ml. of water, dried over sodium sulfate, filtered and evaporated to dryness. The residual material is crystallized to give 230 mg. of 17α-bromoethynyl-5-androstene-3β,17β-diol which has the following properties: M.P. 214–215° C.

I.R. $\lambda_{max.}^{Nujol}$ 2.7, 2.89, 4.55μ

Analysis.—(Calculated for $C_{21}H_{29}O_2Br$): C, 64.10; H, 7.43; Br, 20.32. Found: C, 62.40; H, 7.65; Br, 20.50.

The 17α-bromoethynyl-5-androstene-3β,17β-diol (195 mg.) is dissolved in 1.95 ml. of cyclohexanone and 20 ml. of benzene, using a flask fitted with a magnetic stirrer and a reflux condenser. After 3 ml. of benzene is distilled, a stream of dry nitrogen is passed through the system, and maintained throughout the entire reaction time. After cooling to room temperature, there is added 0.98 ml. of a 10% solution of aluminum isopropoxide in benzene, and the reaction mixture is refluxed for 3 hours and cooled to room temperature. Ten drops of water are added and the reaction mixture is filtered. The filtrate is taken to dryness. The residue is chromatographed on acetone activated acid-washed alumina and eluted with a mixture of seven parts ether to three parts petroleum ether to give 17α-bromoethynyl-4-androstene-17β-ol-3-one, U.V. $\lambda_{max.}^{MeOH}$ 240μ, ε 15,700; I.R. $\lambda_{max.}^{Nujol}$ 2.9, 4.51, 6.0, 6.2μ

In accordance with the above procedures, but using a fluorinating agent, for example, perchloryl fluoride in place of N-bromosuccinimide, there is obtained the 17α-fluoroethynyl-5-androstene-3β,17β-diol-bis-tetrahydropyranyl ether instead of 17α-bromoethynyl-5-androstene-3β,17β-diol-bis-tetrahydropyranyl ether. The latter compound is then treated with concentrated hydrochloric acid to give 17α-fluoroethynyl-4-androstene-17β-ol-3-one.

*Example 5*

A suspension of 610 mg. of 6-chloro-17α-trifluoropropynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-trifluoropropynyl-17β-hydroxy - 2 - hydroxymethylene - 19 - nor - 4,6-androstadiene-3-one, which is taken up in methylene chloride. The solution is filtered and evaporated to dryness.

A 25 mg. aliquot of 6-chloro-17α-trifluoropropynyl-17β-hydroxy-2-hydroxymethylene-19-nor-4,6 - androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-trifluoropropynyl-17β-hydroxy-19-nor-4,6-androstadieno-[3,2-c]pyrazole.

The starting material can be prepared by the following procedures: A 50 cc. three-neck round bottom flask is fitted with a Dry Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture and the mixture is maintained under reflux for one hour, using a Dry Ice-acetone condenser. The reaction is then allowed to warm to room temperature, the excess gaseous trifluoropropyne being distilled off. A solution of 500 mg. of 3-methoxy-2,5(10)-androstadiene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 17α-trifluoropropynyl-3-methoxy-2,5(10)-androstadiene-17β-ol.

To 150 mg. of the above product in 15 cc. of acetone is added 15 mg. of p-toluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-19-nor-4-androstene-3-one, M.P. 128–132° C., I.R. $\lambda_{max.}^{Neat}$ 2.95, 4.45, 6.05, 6.20μ. U.V. $\lambda_{max.}^{MeOH}$ 238μ, ε percent 15,000; $[\alpha]_D^{26°\,C.}$ —21.0, CHCl₃ C., 1.0

To a solution of 100 mg. of 17α-trifluoropropynyl-17β-hydroxy-19-nor-4-androstene-3-one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α-trifluoropropynyl-19-nor-3,5-androstadiene-17β-ol.

A solution consisting of 1 g. of 3-ethoxy-17α-trifluoropropynyl-19-nor-3,5-androstadiene-17β-ol, 700 mg. of sodium acetate, 5 ml. of water and 40 ml. of acetone is cooled to 0° C. and 1.07 g. of N-bromosuccinimide and 0.83 ml. of acetic acid is added. The mixture is stirred for 3 hours at 0.5° C. and then poured into water to yield the 6β-bromo-17α-trifluoropropynyl-17β-hydroxy-19-nor-4-androstene-3-one.

Treatment of 6β-bromo-17α-trifluoropropynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C. followed by dilution with ice water and filtration affords 17α-trifluoropropynyl-17β-hydroxy-19-nor-4,6-androstadiene-3-one.

A solution consisting of 675 mg. of 17α-trifluoropropynyl-17β-hydroxy-19-nor-4,6-androstadiene-3-one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo to give the crude 6,7-epoxy-17α-trifluoropropynyl-17β-hydroxy - 19 - nor-4-androstene-3-one which is used directly in the next step.

The 6,7-epoxy-17α-trifluoropropynyl-17β-hydroxy-19-nor-4-androstene-3-one, dissolved in 20 ml. of 0.4 N hydrochloric acid in chloroform, is allowed to stand for 5.5 hours at room temperature, and then subsequently poured into iced sodium bicarbonate solution. The product is extracted with chloroform, dried and concentrated in vacuo. Chromatography on acid-washed alumina (20 g.) and elution with ether-petroleum ether mixtures affords the 6-chloro-17α-trifluoropropynyl-17β-hydroxy-19-nor-4,6-androstadiene-3-one.

*Example 6*

A suspension of 610 mg. of 6-chloro-17α-trifluoropropynyl-17β-hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-trifluoropropynyl-17β-hydroxy-2-hydroxymethylene-4,6-androstadiene-3-one, which is taken up in methylene chloride. The solution is filtered and evaporated to dryness.

A 25 mg. aliquot of 6-chloro-17α-trifluoropropynyl-17β-hydroxy-2-hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give the 6-chloro-17β-hydroxy-17α-trifluoropropynyl-4,6-androstadieno-[3,2-c]pyrazole.

One hundred mg. of 6-chloro-17α-trifluoropropynyl-17β-hydroxy-4,6-androstadieno-[3,2-c]pyrazole is heated with 2 cc. of acetic anhydride and 1.2 cc. of pyridine on the steam bath overnight. The reaction mixture is then poured onto ice and extracted with chloroform. The extract is washed with water and concentrated to afford as the major component the N-acetyl-17β-acetoxy-6-chloro-17α-trifluoropropynyl-4,6-androstadieno-[3,2-c]pyrazole which is separated by chromatography over acid-washed alumina and eluted with mixtures of ether and petroleum ether.

The 17α-trifluoropropynyl-17β-hydroxy-19-nor-4-androstene-3-one used as starting material can be prepared by the following procedure:

To a solution of one gram of 17β-hydroxy-4-androstene-3-one dissolved in 75 ml. of benzene is added 7.5 ml. of ethylene glycol and 50 g. of p-toluenesulfonic acid. The reaction mixture is heated at reflux with a water separator for 20 hours. The mixture is cooled and about 10 ml. of sodium bicarbonate solution is added. The reaction mixture is then extracted with 3 portions of ether, each portion containing about 100 ml. The combined extracts are washed with water, dried over sodium sulfate and evaporated to dryness to give 3-ethylenedioxy-5-androstene-17β-ol.

A solution of 400 mg. of 3-ethylenedioxy-5-androstene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 3-ethylenedioxy-5-androstene-17-one.

A 50 cc. three-neck round bottom flask is fitted with a Dry-Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture, and the mixture is maintained under reflux for 1 hour, using a Dry-Ice-acetone condenser. The reaction is then allowed to warm to room temperature, the excess gaseous trifluoropropyne being distilled off. A solution of 500 mg. of 3-ethylenedioxy-5-androstene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 3-ethylenedioxy-17α-trifluoropropynyl-5-androstene-17β-ol.

To 150 mg. of the above product in 15 cc. of acetone is added 15 mg. of paratoluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-4-androstene-3-one.

*Example 7*

To a solution of 0.5 millimole of 6-chloro-17α-ethynyl-17β-hydroxy-2-hydroxymethylene-19-nor-4,6-androstadiene-3-one in about 3 ml. of absolute ethanol is added 0.6 millimoles of sodium acetate and then 0.6 millimoles of methylhydrazine sulfate. The mixture is refluxed under nitrogen for 40 minutes and then filtered hot. The filtrate is taken to dryness, water is added, and the N-methyl-6-chloro-17α-ethynyl-17β-hydroxy-19-nor-4,6-androstadieno-[3,2-c]pyrazole is removed by filtration.

A mixture of the 1'-methyl- and 2'-methyl-6-chloro-17α-ethynyl-17β-hydroxy-19-nor-4,6-androstadieno-[3,2-c]pyrazole is prepared by the following route: A mixture of 1 gram of 6-chloro-17α-ethynyl-17β-hydroxy-2-hydroxymethylene-19-nor-4,6-androstadiene-3-one, 200 ml. of methanol, and 200 mg. of p-toluene sulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 6-chloro-17α-ethynyl-17β-hydroxy-2-methoxymethylene-19-nor-4,6-androstadiene-3-one is obtained by chromatography on acid-washed alumina and elution with ether:chloroform mixtures.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-methyl- and the 2'-methyl-6-chloro-17α-ethynyl-17β-hydroxy-19-nor-4,6-androstadieno-[3,2-c]pyrazole.

The 6-chloro-17α-ethynyl-17β-hydroxy - N - methyl-19-nor-4,6-androstadieno-[3,2-c]pyrazole may also be prepared by the following procedure: A solution of about 0.47 millimoles of 6-chloro-17α-ethynyl-17β-hydroxy-19-nor-4,6-androstadieno-[3,2-c]pyrazole in 10 ml. of benzene is treated with 30–38 mg. of about 51% sodium hydride (in oil suspension) after the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue is treated with water and the product is filtered to give 6-chloro-17α-ethynyl-17β-hydroxy-N-methyl-19-nor - 4,6 - androstadieno - [3,2-c] pyrazole.

In accordance with the above procedures, but using other alkylating agents in place of methyl iodide, there is obtained the corresponding N-alkyl-6-chloro-17β-hydroxy-19-nor-4,6-androstadieno-[3,2-c]pyrazole.

In accordance with all of the above procedures, but starting with the 2-hydroxymethylene derivatives of the compounds listed on page 2, there are obtained the corresponding 1'-methyl- and 2-methyl derivatives.

*Example 8*

To 200 mg. of 6-chloro-17α-ethynyl - 17β - hydroxy-2-hydroxymethylene-4,6-androstadiene-3-one in 7 cc. of absolute ethanol is added 82 mg. of sodium acetate and then 102 gms. of cyclohexylhydrazine oxalate. The mixture is refluxed under nitrogen for one hour. The insolubles are removed by filtration. The filtrate is taken to dryness. The residue is dissolved in 3 cc. of ether and the ether solution is washed successively with 2% aqueous sodium hydroxide and then with water to neutrality. The ether solution is then dried over magnesium sulfate, filtered and taken to dryness to give N-cyclohexyl-6-chloro-17α-ethynyl-17b-hydroxy-4,6-androstadieno - [3,2-c]pyrazole.

A mixture of the 1'-cyclohexyl- and 2'-cyclohexyl-6-chloro-17α-ethynyl - 17β - hydroxy - 4,6 - androstadieno-[3,2-c]pyrazole is prepared by the following route: A mixture of 1 gram of 6-chloro-17α-ethynyl-17β-hydroxy-2-hydroxymethylene-4,6-androstadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 6-chloro-17α-ethynyl - 17β - hydroxy-2-methoxymethylene-4,6-androstadiene-3-one is obtained by chromatography on acid-washed alumina and elution with ether:chloroform mixtures.

A mixture of 500 mg. of the above 2-methoxymethylene-steroid, 100 ml. of ethanol, and 1 ml. of cyclohexylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-cyclohexyl- and the 2'-cyclohexyl-6-chloro-17α-ethynyl-17β-hydroxy-4,6-androstadieno-[3,2-c]pyrazole.

In accordance with the above procedure, but using another cycloalkylhydrazine in place of cyclohexylhydrazine there are obtained the corresponding 1'- and 2'-cycloalkyl-derivatives.

*Example 9*

A mixture of 90 mg. of 6-chloro-17α-ethynyl-17β-hydroxy - 2-hydroxymethylene-4,6-androstadiene-3-one, and 0.028 ml. of phenylhydrazine are refluxed under nitrogen in 1.2 ml. of absolute ethanol for about 50 minutes. The reaction mixture is taken to dryness. Water is added and the product is filtered to give an amorphous solid, which is washed successively with water, dilute acid, water, and petroleum ether. The product is crystallized from methanol to afford a product which is predominately the 6-chloro-17α-ethynyl-17β-hydroxy - 2' - phenyl-4,6-androstadieno-[3,2-c]pyrazole.

A mixture of the 1'-phenyl- and 2'-phenyl-6-chloro-17α-ethynyl-17β-hydroxy - 4,6 - androstadieno-[3,2-c]pyrazole is prepared by the following route: A mixture of 1 gram of 6-chloro-17α-ethynyl-17β-hydroxy - 2 - hydroxymethylene-4,6-androstadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 6-chloro-17α-ethynyl - 17β - hydroxy-2-methoxymethylene-4,6-androstadiene-3-one is obtained by chromatography on acid-washed alumina and elution with ether:chloroform mixtures.

A mixture of 500 mg. of the above 2-methoxy-methylene-steroid, 100 ml. of ethanol, and 1 ml. of phenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-phenyl- and 2'-phenyl-6-chloro-17α-ethynyl-17β-hydroxy-4,6-androstadieno-[3,2-c]pyrazole.

In accordance with the above procedures, but starting with the 2-hydroxymethylene-derivative which is obtained from each of the starting materials which are listed in columns 1 and 2, there are obtained the corresponding 1'-phenyl- and 2'-phenyl-derivatives.

In accordance with all of the above procedures, but using other arylhydrazines in place of phenylhydrazine, there are obtained the corresponding 1'-aryl- and 2'-aryl-derivatives.

*Example 10*

A 111.5 mg. sample of 6-chloro-17α-chloroethynyl-17β-hydroxy - 2-hydroxymethylene-19-nor-4,6-androstadiene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. The product is dissolved in methanol and then allowed to crystallize slowly to afford a product which is predominanatly the 6 - chloro - 17α - chloroethynyl-2'-(p-fluorophenyl)-17β-hydroxy-19-nor-4,6-androstadieno-[3,2-c]pyrazole.

A mixture of 1'-(p-fluorophenyl)- and 2'-(p-fluorophenyl) - 6-chloro-17α-chloroethynyl-17β-hydroxy-19-nor 4,6-androstadieno-[3,2-c]pyrazole is prepared by the following route: A mixture of 1 gram of 6-chloro-17α-chloroethynyl - 17β-hydroxy-2-hydroxymethylene-19-nor-4,6-androstadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 6 - chloro - 17α - chloroethynyl-17β-hydroxy-2-methoxymethylene-19-nor-4,6-androstadiene-3-one is obtained by chromatography on acid-washed alumina and elution with ether:chloroform mixtures.

A mixture of 500 mg. of the 2-methoxymethylene-derivative 100 ml. of ethanol, and 1 ml. of p-fluorophenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl) and 2'-(p-fluorophenyl)-6-chloro-17α - chloroethynyl-17β-hydroxy-4,6-androstadieno-[3,2-c]pyrazole.

In accordance with all of the above procedures, but starting with the 2-hydroxymethylene derivative which is obtained from each of the starting materials which are listed in columns 1 and 2, there are obtained the corresponding 1'-(p-fluorophenyl)- and 2'(p-fluorophenyl)-derivatives.

In accordance with all the above procedures, but using p-chlorophenylhydrazine instead of p-fluorophenyl the corresponding p-chlorophenyl-derivatives are obtained.

*Example 11*

To 223 mg. of 17α - bromoethynyl-6-chloro-17β-hydroxy - 2 - hydroxymethylene-19-nor-4,6-androstadiene-3-one in 3 ml. of absolute ethanol is added 49.2 mg. of sodium acetate, and then 105 mg. of p-methoxyphenylhydrazine hydrochloride. The reaction mixture is refluxed for 5 minutes at which time it turns dark. The product is filtered and taken to dryness. The residue is dissolved in ether, filtered, and then stirred with an equal weight of Darco G-60 (a decolorizing charcoal). The filtrate is reduced to a volume of 1 cc. Petroleum ether is added and the product is filtered off to give a product which is predominantly the 17α-bromoethynyl-6-chloro-17β - hydroxy - 2' - (p-methoxyphenyl)-19-nor-4,6-androstadieno-[3,2-c]pyrazole.

Alternately, a mixture of 1'-(p-methoxyphenyl)- and 2'-(p-methoxyphenyl) - 6-chloro-17α-bromoethynyl-17β-hydroxy-19-nor-4,6-androstadieno-[3,2-c]pyrazole is prepared by the following route: A mixture of 1 gram of 17α-bromoethynyl - 6 - chloro-17β-hydroxy-2-hydroxymethylene-19-nor-4,6-androstadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-bromoethynyl-6-chloro-17β-hydroxy-2-methoxymethylene-19-nor-4,6-androstadiene-3-one is obtained by chromatography on acid-washed alumina and elution with ether:chloroform mixtures.

A mixture of 500 mg. of the 2-methoxymethylene derivative, 100 ml. of ethanol, and 1 ml. of p-methoxyphenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-(p-methoxyphenyl), and the 2'-(p-methoxyphenyl)-6-chloro-17α-bromoethynyl - 17β - hydroxy - 19 - nor-4,6-androstadieno-[3,2-c]pyrazole.

In accordance with the above procedure, but starting with the 2-hydroxymethylene-derivative which is obtained from each of the starting materials which are listed in columns 1 and 2, there are obtained the corresponding 1'-(p-methoxyphenyl)- and 2'-(p-methoxyphenyl)-derivatives.

*Example 12*

To a mixture of 223 mg. of 6-chloro-17α-trifluoropropynyl-17β-hydroxy-2-hydroxymethylene - 4,6 - androstadiene-3-one in 5 ml. of absolute ethanol is added 49 mg. of sodium acetate and then 95 mg. of p-tolylhydrazine hydrochloride. The mixture is refluxed under nitrogen for 45 minutes. On cooling, a solid precipitates which is filtered. The filtrate is taken to dryness and water is added. The product is filtered, washed with water, dilute acid, and again with water until neutral. The product is purified by dissolving 235 mg. of the crude material in 30 cc. of methanol and stirring at room temperature with 235 mg. of Nuchar G-1000-N (a decolorizing charcoal). The mixture is filtered and the filtrate is concentrated and then crystallized from a solvent to afford a product which is predominantly 6-chloro-17β-hydroxy-2' - (p - tolyl) - 17α - trifluoropropynyl - 4,6 - androstadieno-[3,2-c]pyrazole.

Alternately, a mixture of 1'-(p-tolyl)- and 2'-(p-tolyl)-6 - chloro - 17α - trifluoropropynyl - 17β - hydroxy-4,6-androstadieno-[3,2-c]pyrazole is prepared by the following route: A mixture of 500 mg. of 6-chloro-17α-trifluoropropynyl-17β-hydroxy-2 - hydroxymethylene - 4,6-androstadiene-3-one, 100 ml. of ethanol and 1 ml. of p-tolylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina, to afford the 6 - chloro - 17β - hydroxy - 17α - trifluoropropynyl - 2-methoxymethylene-4,6-androstadiene-3-one.

A mixture of 500 mg. of the above 2-methoxymethylene derivative, 100 ml. of ethanol, and 1 ml. of p-tolylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-(p-tolyl)- and the 2'-(p-tolyl)-6-chloro-17β-hydroxy-17α-trifluoropropynyl - 4,6 - androstadieno - [3,2 - c]pyrazole.

In accordance with all of the above procedures, but starting with the 2-hydroxymethylene-derivative which is obtained from each of the starting materials which are listed in columns 1 and 2, there are obtained the corresponding 1'-(p-tolyl)- and 2'-(p-tolyl)-derivatives.

*Example 13*

To 200 mg. of 6-chloro-17β-hydroxy-2-hydroxymethylene-17α-trifluoropropynyl-19-nor-4,6 - androstadiene - 3-one in 7 cc. of absolute ethanol is added 82 mg. of sodium acetate and then 102 gms. of benzylhydrazine oxalate. The mixture is refluxed under nitrogen for one hour. The insolubles are removed by filtration. The filtrate is taken to dryness and the residue is dissolved in 3 cc. of ether. The ether solution is washed successively with 2% aqueous sodium hydroxide and then with water to neutrality. The ether solution is then dried over magnesium sulfate, filtered and taken to dryness to afford N-benzl - 6 - chloro-17β-hydroxy-17α-trifluoropropynyl-19-nor-4,6-androstadieno-[3,2-c]pyrazole.

Alternately, a mixture of 1'-benzyl- and 2'-benzyl-6-chloro - 17β - hydroxy-17α-trifluoropropynyl-19-nor-4,6-androstadieno-[3,2-c]pyrazole is prepared by the following route: A mixture of 1 gram of 6-chloro-17β-hydroxy-2-hydroxymethylene-17α-trifluoropropynyl-19 - nor - 4,6 - androstadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 6-chloro-17β - hydroxy-2-methoxymethylene-17α-trifluoropropynyl-19-nor-4,6-androstadiene-3-one is obtained by chromatography on acid-washed alumina and elution with ether: chloroform mixtures.

A mixture of 500 mg. of 6-chloro-17β-hydroxy-2-methoxymethylene-17α-trifluoropropynyl-19-nor-4,6 - androstadiene-3-one, 100 ml. of ethanol, and 1 ml. of benzylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-benzyl- and the 2'-benzyl-6-chloro-17β-hydroxy-17α-trifluoropropynyl-19 - nor-4,6-androstadieno-[3,2-c]pyrazole.

In accordance with all of the above procedures, but starting with the 2-hydroxymethylene-derivative, which is obtained from each of the starting materials which are listed in columns 1 and 2, there are obtained the corresponding 1'-benzyl-, and 2'-benzyl-derivatives.

In accordance with the above procedures, by using other aralkylhydrazines in place of benzylhydrazine, there are obtained the corresponding 1'- and 2'-aralkyl-derivatives.

*Example 14*

A suspension of 610 mg. of 6-chloro-17α-ethynyl-17β-methoxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with water, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness, to give 6-chloro-17α-ethynyl-2-hydroxymethylene-17β-methoxy-4,6-androstadiene-3-one.

A 25 mg. aliquot of 6-chloro-17α-ethynyl-2-hydroxymethylene-17β-methoxy-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-ethynyl-17β-methoxy-4,6-androstadieno-[3,2-c]pyrazole.

The starting material for the above reaction is prepared by the following procedure: A mixture of 500 mg. of 6 - chloro - 17α - trifluoropropynyl - 17β - hydroxy - 4,6 - androstadiene-3-one, 10 ml. of dimethylformamide, 20 ml. of methyl iodide, and 1.5 gms. of silver oxide is stirred at room temperature for 4 days, an additional ½ gm. of silver oxide being added at the end of each day. One-hundred ml. of chloroform is then added to the reaction mixture and the mixture is stirred for one hour and filtered. The filtrate is evaporated to dryness and the residual oil is chromatographed over acid-washed alumina and eluted with mixtures of ether and petroleum ether to give 6-chloro-17β-methoxy-17α-trifluoropropynyl-4,6-androstadiene-3-one.

*Example 15*

To a solution of 100 mg. of 6-chloro-17α-trifluoropropynyl-17β-hydroxy-4,6-androstadieno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford N-acetyl-17β-acetoxy-6 - chloro - 17α - trifluoropropynyl - 4,6 - androstadieno - [3,2-c]pyrazole which is isolated by the addition of water and filtration.

In accordance with the above procedure, but using an equivalent quantity of another acylating agent in place of acetic anhydride, there is obtained the corresponding N - acyl - 17β - acyloxy - 6 - chloro - 17α - trifluoropropynyl-4,6-androstadieno-[3,2-c]pyrazole.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group of compounds having structural formulas A and B:

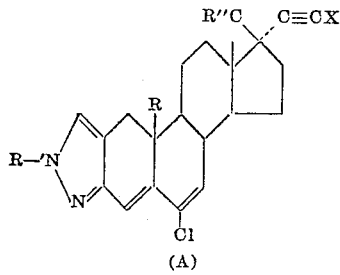
(A)

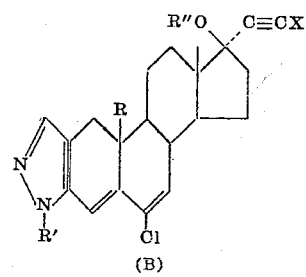
(B)

wherein X is selected from the group consisting of hydrogen, halogen and the trifluoromethyl group, R is selected from the group consisting of hydrogen and methyl, R' is selected from the group consisting of hydrogen, lower hydrocarbon carboxylic acyl, alkyl, cycloalkyl, aryl and aralkyl, and R" is selected from the group consisting of hydrogen, alkyl and lower hydrocarbon carboxylic acyl.

2. 6 - chloro - 17α - ethynyl - 17β - hydroxy - 19 -nor - 4,6-androstadieno-[3,2-c]pyrazole.

3. 6 - chloro - 17α - ethynyl - 17β - hydroxy - 4,6-androstadieno-[3,2-c]pyrazole.

4. 6 - chloro - 17α - chloroethynyl - 17β - hydroxy - 19 - nor-4,6-androstadieno-[3,2-c]pyrazole.

5. 6 - chloro - 17α - chloroethynyl - 17β - hydroxy - 4,6-androstadieno-[3,2-c]pyrazole.

6. 6 - chloro - 17α - trifluoropropynyl - 17β - hydroxy - 19-nor-4,6-androstadieno-[3,2-c]pyrazole.

7. 6 - chloro - 17α - trifluoropropynyl - 17β - hydroxy - 4,6-androstadieno-[3,2-c]pyrazole.

8. 6 - chloro - 17α - ethynyl - 2' - methyl - 17β - hydroxy-19-nor-4,6-androstadieno-[3,2-c]pyrazole.

9. 6 - chloro - 2' - cyclohexyl - 17α - ethynyl - 17β - hydroxy-4,6-androstadieno-[3,2-c]pyrazole.

10. 6 - chloro - 17α - ethynyl - 2' - phenyl - 17β - hydroxy-4,6-androstadieno-[3,2-c]pyrazole.

11. 6 - chloro - 17α - chloroethynyl - 2' - (p - fluorophenyl)-17β-hydroxy-4,6-androstadieno-[3,2-c]pyrazole.

12. 6 - chloro - 17α - bromoethynyl - 2' - (p - methoxyphenyl) - 17β - hydroxy - 19 - nor - 4,6 - androstadieno - [3,2-c]pyrazole.

13. 6 - chloro - 2' - (p - tolyl) - 17α - trifluoropropynyl - 17β-hydroxy-4,6-androstadieno-[3,2-c]pyrazole.

14. 2' - benzyl - 6 - chloro - 17α - trifluoropropynyl - 17β-hydroxy-19-nor-4,6-androstadieno-[3,2-c]pyrazole.

15. N-lower hydrocarbon carboxylic acyl-17β-acyloxy-6 - chloro - 17α - trifluoropropynyl - 4,6 - androstadieno-[3,2-c]pyrazole.

16. 6 - chloro - 17α - ethynyl - 17β - methoxy - 2 - hydroxymethylene-4,6-androstadiene-3-one.

17. 6 - chloro - 17α - ethynyl - 17β - methoxy - 4,6 - androstadieno-[3,2-c]pyrazole.

No references cited.